United States Patent
Gupta et al.

(10) Patent No.: US 10,558,849 B2
(45) Date of Patent: Feb. 11, 2020

(54) DEPICTED SKIN SELECTION

(71) Applicant: Adobe Inc., San Jose, CA (US)

(72) Inventors: Angad Kumar Gupta, Ghaziabad (IN); Gagan Singhal, Delhi (IN)

(73) Assignee: Adobe Inc., San Jose, CA (US)

( * ) Notice: Subject to any disclaimer, the term of this patent is extended or adjusted under 35 U.S.C. 154(b) by 164 days.

(21) Appl. No.: 15/838,259

(22) Filed: Dec. 11, 2017

(65) Prior Publication Data

US 2019/0180083 A1 Jun. 13, 2019

(51) Int. Cl.
*G06K 9/00* (2006.01)
*G06T 7/90* (2017.01)

(52) U.S. Cl.
CPC ..... *G06K 9/00275* (2013.01); *G06K 9/00228* (2013.01); *G06K 9/00362* (2013.01); *G06T 7/90* (2017.01); *G06T 2210/12* (2013.01)

(58) Field of Classification Search
CPC .............................. G06K 9/00275; G06T 7/90
See application file for complete search history.

(56) References Cited

U.S. PATENT DOCUMENTS

| | | | | |
|---|---|---|---|---|
| 8,331,614 | B2 * | 12/2012 | Mannerheim | G06K 9/00234 382/103 |
| 8,983,121 | B2 * | 3/2015 | Lim | G06K 9/00771 382/103 |
| 10,282,431 | B1 * | 5/2019 | Bhotika | G06F 16/5838 |
| 2002/0150291 | A1 * | 10/2002 | Naf | G06T 11/001 382/162 |
| 2005/0008198 | A1 * | 1/2005 | Guo | G06K 9/00228 382/115 |
| 2008/0107341 | A1 * | 5/2008 | Lu | G06K 9/00248 382/190 |
| 2011/0026780 | A1 * | 2/2011 | Corcoran | G06K 9/00228 382/118 |
| 2011/0040191 | A1 * | 2/2011 | Kyle | A61B 5/015 600/473 |

(Continued)

OTHER PUBLICATIONS

"Select a color range in an image", Retrieved at: https://helpx.adobe.com/photoshop/using/selecting-color-range-image.html—on Sep. 5, 2017, 7 pages.

(Continued)

*Primary Examiner* — Mia M Thomas
(74) *Attorney, Agent, or Firm* — SBMC

(57) ABSTRACT

Depicted skin selection is described. An image processing system selects portions of a digital image that correspond to exposed skin of persons depicted in the digital image without selecting other portions. Initially, the image processing system determines a bounding box for each person depicted in the digital image. Based solely on the portion of the digital image within the bounding box, the image processing system generates an object mask indicative of the pixels of the digital image corresponding to a respective person. Portions of the digital image outside the bounding box are not used for generating this object mask. The image processing system then identifies the pixels of the digital image indicated by the object mask and having a similar color to a range of exposed skin colors determined for the respective person. The processing system generates skin selection data describing the identified pixels and enabling the exposed skin selection.

20 Claims, 8 Drawing Sheets

(56) References Cited

U.S. PATENT DOCUMENTS

| | | | | |
|---|---|---|---|---|
| 2012/0051658 | A1* | 3/2012 | Tong | G11B 27/034 |
| | | | | 382/224 |
| 2013/0230240 | A1* | 9/2013 | Muninder | G06K 9/00234 |
| | | | | 382/165 |
| 2014/0310271 | A1* | 10/2014 | Song | G06K 9/00288 |
| | | | | 707/732 |
| 2014/0341442 | A1* | 11/2014 | Lewis | G06K 9/00248 |
| | | | | 382/118 |
| 2017/0278289 | A1* | 9/2017 | Marino | G06T 7/44 |
| 2018/0350030 | A1* | 12/2018 | Simons | G06T 13/40 |
| 2018/0352150 | A1* | 12/2018 | Purwar | G06K 9/00248 |
| 2019/0026547 | A1* | 1/2019 | Chen | G06K 9/00362 |
| 2019/0073767 | A1* | 3/2019 | Cheng | G06T 7/0014 |
| 2019/0122367 | A1* | 4/2019 | Hougen | G06T 7/337 |
| 2019/0205655 | A1* | 7/2019 | Matsuoka | G06K 9/00771 |

OTHER PUBLICATIONS

Girshick, "Fast R-CNN—Object Detection with Caffe", Retrieved at: http://tutorial.caffe.berkeleyvision.org/caffe-cvpr15-detection.pdf, May 2016, 30 pages.

* cited by examiner

DEPICTED SKIN SELECTION

BACKGROUND

Advances in content processing technologies enable computing systems to mark specific portions of digital images as selected. This is an indispensable task in digital image editing, as doing so serves as a starting point for many image editing operations, such as content replacement, color and tone manipulation, blurring, copying and pasting, and so on. These computing systems can, for instance, select portions of digital images based on user inputs received relative to the portions. An example of image content that client device users may provide input for selecting is human skin. These users may do so to perform a variety of image editing operations in relation to skin depicted in images, such as to remove blemishes from the skin, smooth the skin, darken the skin, lighten the skin, and so forth.

Conventionally configured systems for selecting skin in digital images may select not only the skin in these digital images but also non-skin portions having a similar color to the skin. Consequently, conventional systems may force client device users to manually initiate operations to remove selected non-skin portions—or provide additional inputs to select just the skin from these initially selected portions— before they can perform desired image editing operations in relation just to the depicted skin. Accordingly, selecting solely exposed skin of digital images may be tedious with conventionally configured systems. Due to this, client device users may avoid performing operations in relation solely to skin and thus may not create digital content with exposed skin that is visually pleasing.

SUMMARY

To overcome these problems, depicted skin selection is described. An image processing system selects portions of a digital image that correspond to exposed skin of persons depicted in the digital image without selecting other portions of the digital image. Initially, the image processing system determines a bounding box for each person depicted in the digital image. Based solely on the portion of the digital image within the bounding box, the image processing system generates an object mask indicative of the pixels of the digital image that correspond to a respective person. Portions of the digital image outside the bounding box are not used for generating the object mask. The image processing system then identifies the pixels of the digital image that are indicated by the object mask having a color similar to a range of exposed skin colors determined for the respective person. The processing system generates skin selection data describing the identified pixels and enabling the exposed skin selection.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
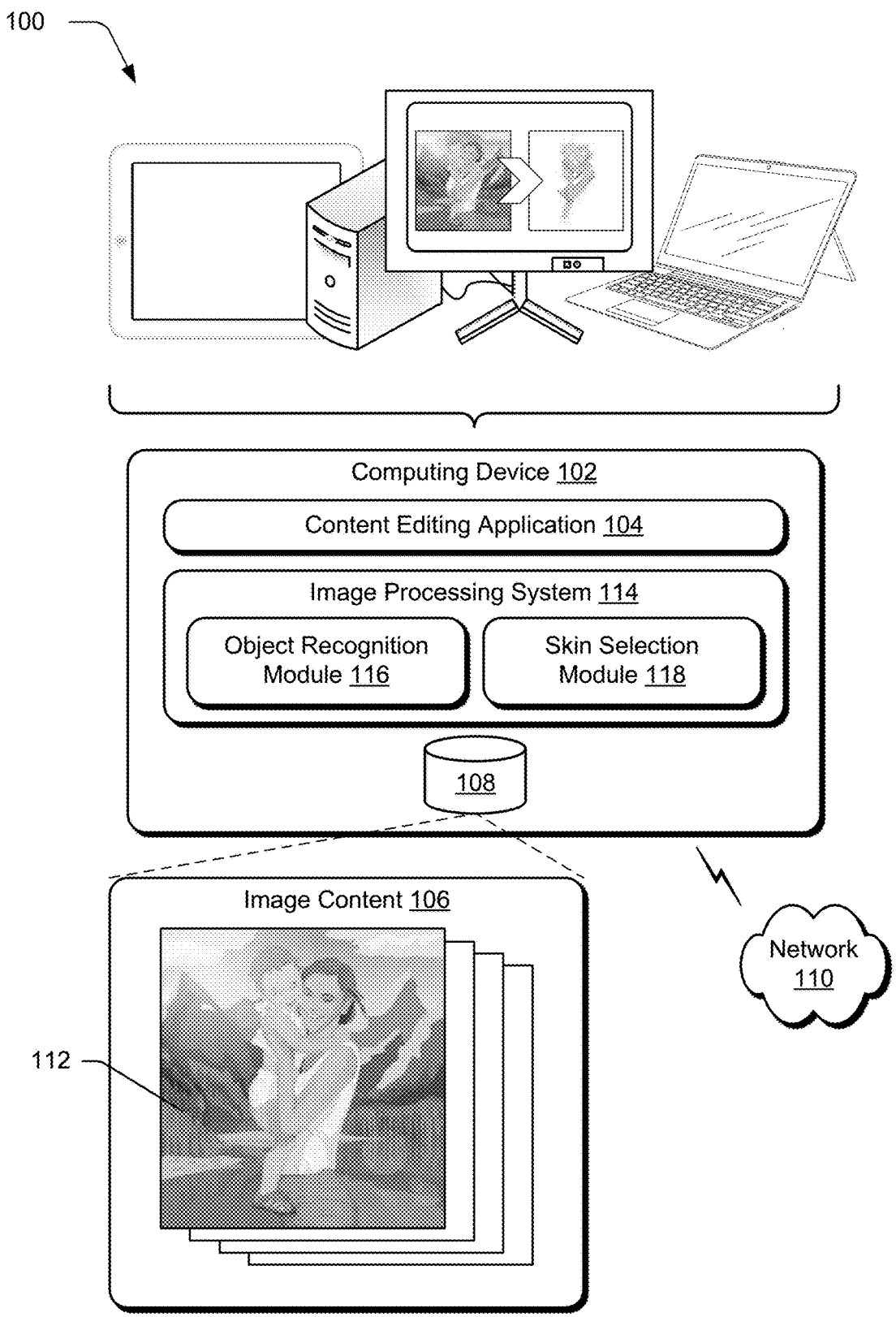
FIG. 1 is an illustration of an environment in an example implementation that is operable to employ techniques described herein.

As a result of advances in content processing technologies, computing systems are capable of marking specific portions of digital images as selected. This is an indispensable task in digital image editing, as doing so serves as a starting point for many image editing operations, such as content replacement, color and tone manipulation, blurring, copying and pasting, and so on. Human skin is an example of digital image content that client device users may desire to select for performing image operations. These image operations may include, for instance, removing blemishes from the skin, smoothing the skin, darkening the skin, lightening the skin, and so forth. However, conventionally configured systems may select not only the skin depicted in these digital images but also non-skin portions having a similar color to the depicted skin. Due to this, client device users may avoid performing operations in relation solely to exposed skin and thus may not create digital content with exposed skin that is visually pleasing.

To overcome these problems, depicted skin selection is described. In accordance with the described techniques, an image processing system selects portions of digital images that correspond to exposed skin of persons depicted in these digital images without selecting other portions of the digital images. For instance, the image processing system selects portions of the digital images that correspond to exposed faces, hands, necks, ears, arms, legs, and so on, of persons depicted in digital images. In other words, the image processing system selects skin of depicted persons that is not covered by clothing or occluded by other depicted objects, e.g., hair. Moreover, the processing system selects the exposed skin without selecting other portions of the digital images, including other portions of the digital images having colors that are the same as or similar to skin of the depicted persons. Many images, for instance, include natural features (e.g., rocks, land, plants, and so forth) that have a same or similar color as a person depicted in the image. The described image processing system is capable of selecting the exposed skin of the depicted persons without selecting portions of the digital images that correspond to these features.

To select the exposed skin, the image processing system initially determines a bounding box for each person depicted in a digital image. If two persons are depicted in a digital image, for instance, then the image processing system determines two bounding boxes; one for each person. In one or more implementations, the image processing system determines these bounding boxes using a machine learning model (e.g., a regional convolutional neural network (RCNN)) trained to receive digital images as input and provide bounding boxes surrounding persons depicted in the digital images as output.

Given these bounding boxes, the image processing system generates object masks for each person depicted in the digital image. Broadly speaking, an object mask indicates pixels of a digital image that correspond to a person surrounded by the respective bounding box. In contrast to conventional techniques, the image processing system is limited to processing solely the pixels within the respective bounding box when generating an object mask of a depicted person—the image processing system does not consider the pixels outside the bounding box for generating a mask. In one or more implementations, the image processing system uses another machine learning model (e.g., a deep learning model) to generate these object masks from the bounding boxes. This machine learning model is separate from the machine learning model used to determine the bounding boxes, and is trained to receive the bounding boxes as input and provide the object masks of the depicted persons as output.

The image processing system then identifies the pixels indicated by the object mask having a color that is the same as or similar to a determined range of skin colors of the depicted person. As discussed in more detail below, the range of skin colors may be determined by performing facial recognition and identifying colors of pixels that correspond to facial skin of the depicted person. In any case, the image processing system generates skin selection data describing the identified pixels. In one or more implementations, the skin selection data is formed as a grayscale mask. Regardless of its form, the skin selection data enables the image processing system to select the exposed skin of persons depicted in the digital image without selecting other portions of the digital image.

The image processing system thus performs image editing operations, e.g., initiated via a content editing application, in relation to the selected skin without performing those operations on the other portions of the image. To this end, the image processing system enables a client device user to provide a single user input to select the skin of persons in a digital image and, further, simply select to perform skin-based image editing operations, such as blemish removal, smoothing, darkening, lightening, and so forth. This contrasts with techniques that involve a client device user providing further selection input to select solely the skin from initially selected skin-colored objects in a digital image and/or providing input to remove skin-colored objects that are not actually skin. The image processing system thus supports carrying out skin-based editing operations more efficiently than conventional techniques. Accordingly, client device users may leverage this functionality to perform skin-based editing operations more often than they are performed in connection with conventional techniques. This can lead to creation of more visually pleasing images of persons.

Term Descriptions

As used herein, the term "exposed skin" refers to skin of a person depicted in a digital image and that is not occluded by another depicted object, such as hair, clothing, another person, an inanimate object, and so on.

As used herein, the term "facial landmark" refers to a particular portion of a person's face that is distinguishable from other portions of the person's face by one or more computing techniques. By way of example, facial landmarks include eyes, mouth, nose, brows, cheeks, jawline, forehead, and so forth.

As used herein, the term "non-skin" facial landmark refers to a facial landmark which corresponds to a particular portion of a person's face that is predetermined not to be skin. Examples of non-skin facial landmarks include eyes, mouth (e.g., lips, teeth, etc.), brows, and so on.

As used herein, a "similar" color corresponds to a color that is within a threshold difference of another color or range of colors. This threshold difference may correspond to a predetermined similarity threshold, which may be user adjustable, e.g., via an interface instrumentality of a content editing application.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 7.

The computing device 102 is illustrated as including content editing application 104. The content editing application 104 represents functionality of the computing device 102 to create and/or edit digital content. By way of example, the content editing application 104 includes functionality to edit digital images, such as digital photographs. For instance, the content editing application 104 may enable a client device user to interact with application interfaces presented via the computing device 102 to perform image editing operations, such as selecting portions of digital images, cropping digital images, zooming digital images, scaling digital images, applying filters (e.g., blurring, blending, color-changing, masking, adding effects, and so on) to selected portions of digital images, and so forth. The content editing application 104 may facilitate other image editing operations without departing from the spirit or scope of the techniques described herein. The content editing application 104 may further be representative of more than one application that supports functionality to perform image editing operations without departing from the spirit or scope of the techniques described herein.

The digital images relative to which the content editing application 104 is configured to perform operations are represented by image content 106, which is illustrated as maintained in storage 108 of the computing device 102. Although the image content 106 is illustrated as being maintained in the storage 108, the image content 106 may also represent digital images accessible to the computing device 102 in other ways, e.g., accessible to the computing device 102 from storage of another device over network 110. In such implementations, the computing device 102 may represent functionality to perform the depicted skin selection described above and below for other devices, e.g., to offload some of the computing burden of doing so from those devices. In other words, the computing device 102 may be configured to provide skin selection as a service—and thus be considered associated with a service provider.

The image content 106 may represent various types of digital images without departing from the spirit or scope of the techniques described herein. The image content 106 is depicted with photographic image 112, for instance, which represents a digital image having at least some depicted content that is captured with an image-capturing device, e.g., a camera. Broadly speaking, image content that originates from an image-capturing device may be referred to as having the characteristic of being "photorealistic" and may be referred to herein as "photographic content." Photographic content contrasts with "computer-generated" content, such as vector graphics. Nevertheless, image editing operations may be performed in relation to photographic digital content in a manner such that these digital images maintain the quality of being photorealistic, e.g., zooming, cropping, scaling, some filtering, blurring, recoloring, and so forth. In some scenarios, depicted content that is captured with an image-capturing device (photographic content) may correspond to an entirety of a digital image, e.g., an originally captured image, a filtered image, and so forth. Using the content editing application 104, though, digital images having some photographic content (e.g., depicted content captured with an image capturing device), but corresponding to less than an entirety of the image, may also be generated. Examples of such images include digital image compositions, which may be formed using portions of captured content as well as other content, e.g., vector graphics. In one or more implementations, the image content 106 may correspond to frames of a video, such as a digital video relative to which the discussed depicted skin selection techniques are leveraged. Regardless, the discussed techniques are described generally in relation to the photographic image 112 for the sake of clarity.

Figure 2:
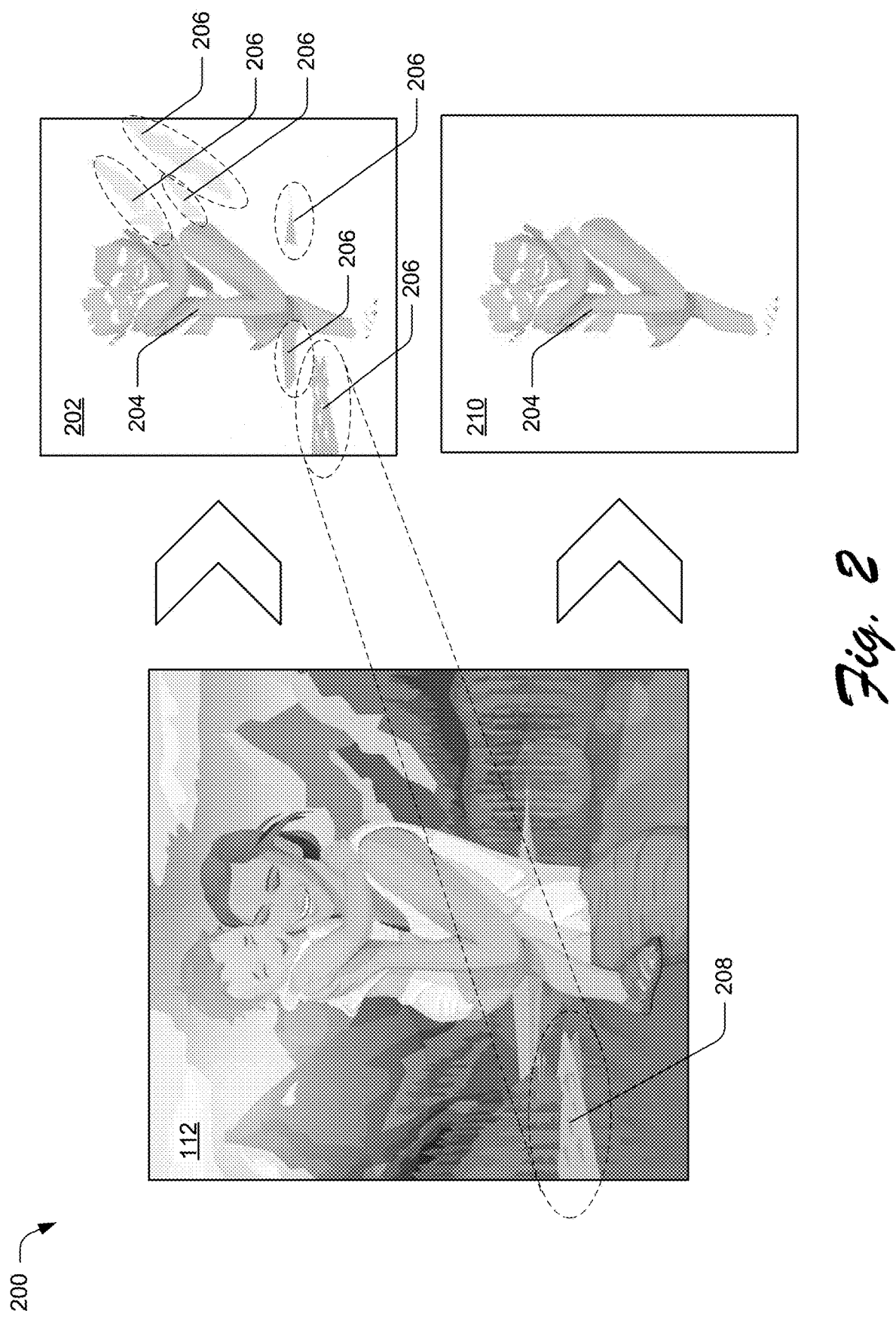
FIG. 2 depicts an example selection of skin-colored portions of a photorealistic digital image and an example selection of exposed skin depicted in the photorealistic digital image without selecting other portions of the image.

The computing device 102 is illustrated as including image processing system 114, the functionality of which may be incorporated in and/or accessible to the content editing application 104. The image processing system 114 is implemented at least partially in hardware of the computing device 102 to generate selections of person's skin depicted in the image content 106 without selecting other portions of the image content. In this context, consider FIG. 2, which depicts at 200 an example selection of skin-colored portions of a photorealistic digital image and an example selection of exposed skin depicted in the photorealistic digital image without selecting other portions of the image.

The illustrated example 200 includes the represented photographic image 112 from FIG. 1 and also includes skin-colored selection 202. The skin-colored selection 202 corresponds to selections made using conventional skin-selecting techniques, e.g., when a client device user of a conventionally configured image editing application interacts with an interface instrumentality to select skin of persons depicted in the photographic image 112. The skin-colored selection 202 includes selected skin 204 of the woman and child depicted in the photographic image 112 and also includes non-skin selections 206. These non-skin selections 206 correspond to portions of the photographic image 112 depicting content that is not human skin. Instead, these non-skin selections 206 correspond to other, non-human portions of the photographic image 112 with colors that are similar or the same as human skin. The indicated non-skin selection 206 corresponds to depicted shoreline 208 of the photographic image 112, for example. However, the depicted shoreline 208 does not correspond to human skin. Selections like the skin-colored selection 202 may force client device users to manually remove non-skin selections 206 before they can perform desired operations in relation to the selected skin 204.

In contrast to the skin-colored selection 202, skin selection 210 includes the selected skin 204 of the woman and child depicted in the photographic image 112 and, notably, without the non-skin selections 206. To select the selected skin 204 from the photographic image 112 without non-skin portions (e.g., the non-skin selections 206), and thus generate the skin selection 210, the image processing system 114 leverages functionality represented by object recognition module 116 and skin selection module 118. Although illustrated as implemented locally at the computing device 102, functionality of the illustrated image processing system 114 may also be implemented in whole or part via functionality available via the network 110, such as part of a web service or "in the cloud."

The object recognition module 116 and the skin selection module 118 are implemented at least partially in hardware of the computing device 102 (e.g., through use of a processing system and computer-readable storage media) to recognize persons depicted in the photographic image 112 and, based in part on this recognition, generate the skin selection 210, which includes the selected skin 204 without including selections of non-skin portions of the photographic image 112—even though other portions of the photographic image 112 may have a same or similar color as skin of the persons recognized in the image.

To generate selections solely of skin of persons depicted in an image, the object recognition module 116 initially recognizes persons depicted within an image, e.g., the photographic image 112. In one or more implementations, the object recognition module 116 is configured to include or access a machine-learning model capable of recognizing a person depicted in an image. The object recognition module 116 can use any type of machine-learning techniques capable of identifying one or more persons within digital images. According to various implementations, such a machine-learning model uses supervised learning, unsupervised learning, or reinforcement learning. For example, the machine-learning model can include, but is not limited to, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. In any case, the object recognition module 116 may use machine-learning techniques to continually train and update the machine-learning model (or, in other words, to update a trained machine-learning model) to accurately identify persons depicted in an image based on training images depicting persons and feedback from users.

Once persons are identified in an image, the object recognition module 116 is further configured to determine a boundary of each person detected in the image. Then the skin selection module 118 determines which portions of the photographic image 112 correspond to skin based on the persons recognized by the object recognition module 116. In accordance with the techniques described herein, the skin selection module 118 limits a search for identifying skin-colored pixels to solely the image pixels that correspond to recognized persons—as indicated by data (e.g., person masks) provided by the object recognition module 116.

By providing selections solely of skin of persons depicted in digital images, and not of other portions of digital images that are simply skin-colored (but are not actually skin), the image processing system 114 aids client device users in performing skin-based editing operations with content editing applications. These skin based operations may include, for example, blemish removal, skin smoothing, skin lightening or darkening, and so forth. Notably, the techniques deployed by the image processing system 114 enable these users to avoid removing selected skin-colored portions of a digital image that are not actually skin before performing skin-based editing operations. The image processing system 114 thus enables such skin-based editing operations to be carried out efficiently than conventional techniques. Accordingly, client device users may leverage this functionality to perform skin-based editing operations more often than they are performed in connection with conventional techniques. Moreover, this can lead to creation of more visually pleasing images of persons. Operation of the object recognition module 116 and the skin selection module 118 is described in greater detail in relation to FIG. 3 in the following description.

Depicted Skin Selection

Figure 3:
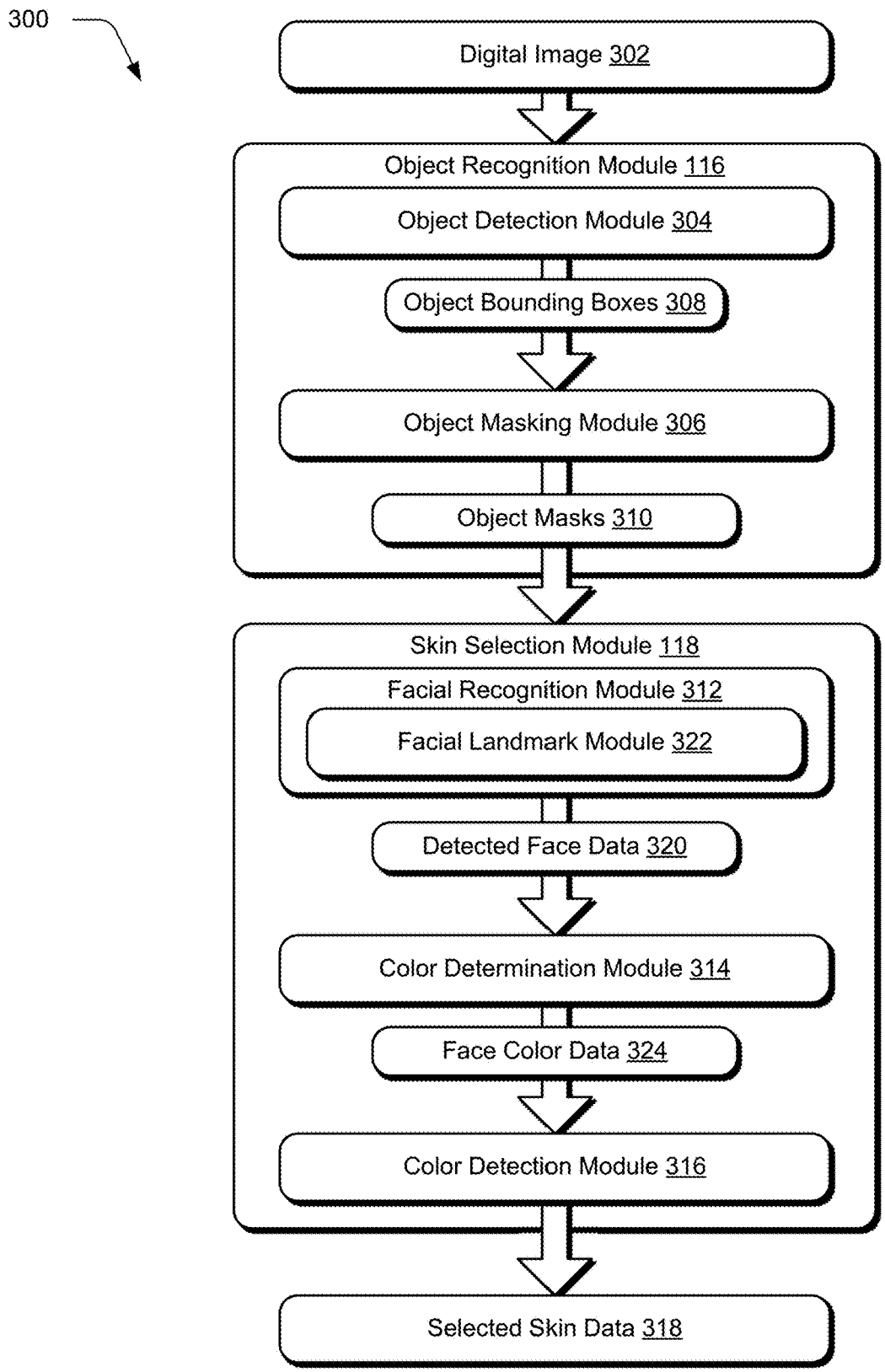
FIG. 3 depicts an example implementation in which an image processing system of FIG. 1 determines portions of a photorealistic digital image depicting a person's skin and generates data to select the skin without selecting other portions of the image.

FIG. 3 depicts a system 300 in an example implementation in which operation of the object recognition module 116 and the skin selection module 118 is described in more detail as determining portions of a photorealistic digital image that depict a person's skin and as generating data to select the skin without selecting other portions of the image.

The object recognition module 116 and the skin selection module 118 in this example are incorporated as part of a system to generate data effective to select a portion of a digital image 302 that corresponds to exposed skin of a person depicted in the image. The digital image 302 may correspond to the photographic image 112 in accordance with the described techniques. To begin, the object recognition module 116 obtains the digital image 302 for skin selection. The object recognition module 116 may obtain the digital image 302, for instance, in response to a user selection of a skin selection option presented via a user interface, e.g., of the content editing application 104. The object recognition module 116 processes the digital image 302 using functionality represented by object detection module 304 and object masking module 306.

Broadly speaking, the object detection module 304 represents functionality to detect a specific type of object from the digital image 302. In connection with the described techniques, the object detection module 304 is configured to detect a person or multiple persons depicted in digital images. In one or more implementations, the object detection module 304 includes or has access to a machine-learning model that is configured to detect the specific type of object based on a training process in which the model is exposed to a set of images having the specific type of object. As described in the example environment 100, the machine-learning model leveraged may comprise any of various types of models, such as a regional convolutional neural network (RCNN). To the extent that the described techniques utilize data indicative of persons detected in images, a machine-learning model included in or accessible to the object detection module 304 is configured to detect persons. This machine-learning model may be configured to do so based on a training process in which the model is exposed to images having one or more persons. In any case, the object detection module 304 is capable of detecting persons depicted in digital images.

In connection with detecting one or more persons depicted in the digital image 302, the object detection module 304 generates object bounding boxes 308. The object detection module 304 generates each of these object bounding boxes 308 for an individual detected person. Broadly speaking, the object detection module 304 generates each of the object bounding boxes 308 to surround a detected person, such that each pixel of the digital image 302 that corresponds to the detected person is included within a portion of the image indicated by the respective bounding box. In one or more implementations, the object bounding boxes 308 have rectangular shapes. For instance, the data describing an example bounding box indicates a left side of the box that corresponds to a left-most pixel of the digital image 302 determined to be part of a respective person. Further, a right side of this example bounding box corresponds to a right-most pixel of the digital image 302 determined to be part of the person, a top side of the box corresponds to a top-most pixel of the digital image 302 determined to be part of the person, and a bottom side of the box corresponds to a bottom-most pixel of the digital image 302 determined to be part of the person.

Based on the object bounding boxes 308, the object masking module 306 generates object masks 310. In particular, the object masks 310 are indicative of pixels within the object bounding boxes 308 that correspond to depicted persons in the digital image 302. In one or more implementations, the object masking module 306 includes or has access to a machine-learning model, which is different from a machine-learning model leveraged by the object detection module 304. Accordingly, the machine-learning model is leveraged by the object masking module 306 to determine the pixels of the digital image 302 that correspond to a detected person. In operation, the object masking module 306 provides a portion of the image defined by the object bounding box 308 as input to this machine-learning model. The object masking module 306 then receives a respective object mask 310 as output from this machine-learning model. To this end, the object recognition module 116 may leverage multiple machine-learning models, including one or more machine-learning models to produce the object bounding boxes 308 and one or more different machine-learning models to produce the object masks 310.

The object masking module 306 may generate the object masks 310 to indicate the correspondence of pixels to a detected person in a variety of ways in accordance with the described techniques. By way of example, the object masking module 306 may generate each object mask 310 as, or to include, a data structure having a bit that corresponds to each pixel of the digital image 302. To provide an object mask for one detected person, for instance, the object masking module 306 may set bits corresponding to pixels depicting the detected person to '1' and bits corresponding to pixels that do not depict the detected person (e.g., that depict another person or depict some other object) to '0'. Alternately, the object masking module 306 may set bits corresponding to pixels depicting the detected person to '0' and bits corresponding to pixels that do not depict the detected person to '1'. The object masking module 306 may form the object masks 310 to indicate the pixels within the object bounding boxes 308 that correspond to detected persons in other ways without departing from the spirit or scope of the described techniques.

The skin selection module 118 is depicted obtaining the object masks 310. Broadly speaking, the skin selection module 118 leverages functionality represented by facial recognition module 312, color determination module 314, and color detection module 316 to generate selected skin data 318. The selected skin data 318 is indicative of the pixels of the digital image 302 that correspond to exposed skin of a depicted person or persons in the digital image 302. The selected skin data 318 may be configured as a mask indicative of pixels of the digital image 302 that are determined to depict exposed skin, e.g., face, neck, hand, leg, and so forth. Alternately or in addition, the selected skin data 318 may be configured in some other way that enables image editing operations to be performed with the content editing application 104 in relation solely to the depicted skin, e.g., blemish removal, smoothing, brightening, lightening, darkening, and so forth. In accordance with the principles discussed herein, the selected skin data 318 is effective to select exposed skin depicted in the digital image 302 (e.g., for image editing operations) without selecting other portions of the image, such as skin-colored portions that do not correspond to persons, portions that correspond to clothes of depicted persons, and so forth.

To generate the selected skin data 318, the skin selection module 118 leverages functionality represented by the facial recognition module 312. The facial recognition module 312 detects faces depicted in digital images. In the illustrated example, the facial recognition module 312 provides detected face data 320. The detected face data 320 is indicative of faces detected in the digital image 302, such as to indicate the pixels of the digital image 302 that correspond to depicted faces. The detected face data 320 may indicate these detected faces in a variety of ways, such as by conveying locations of detected faces in the image using image coordinates, conveying the detected faces with masks for the faces, and so forth. In one or more implementations, the facial recognition module 312 may be limited to performing facial recognition techniques within the object bounding boxes 308, e.g., the facial recognition module 312 may limit use of a facial recognition algorithm to pixels within the object bounding boxes 308. Alternately or in addition, the facial recognition module 312 may be limited to performing facial recognition techniques within the object masks 310, e.g., the facial recognition module 312 may limit use of a facial recognition algorithm to pixels indicated by the object masks 310. Although the described techniques are discussed with reference to determining colors from faces, other body parts can be used to identify skin colors, e.g., in scenarios where a digital image depicts skin but not a face. In such scenarios, the skin selection module 118 may leverage a suitably configured module, such as a hand detection module, to detect a particular body part and generate data indicative of the detected body part, e.g., detected hand data. Skin colors can then be identified based on the data indicative of this detected body part.

In the illustrated example, the facial recognition module 312 includes facial landmark module 322. The facial landmark module 322 represents functionality to detect particular portions ("landmarks") of a person's face depicted in image content, such as a nose, eyes, brows, mouth (e.g., lips, teeth, etc.), jawline, forehead, cheeks, neck, and so forth. The facial landmark module 322 is also configured to generate data describing which portions of image content correspond to these landmarks. For instance, the facial landmark module 322 can generate data that describes the portions of the digital image 302 that correspond to a person's nose, the portions of the digital image 302 that correspond to the person's eyes, and so forth.

In one or more implementations, the facial recognition module 312 uses the information produced by the facial landmark module 322 to remove from a detected face certain landmarks that do not correspond to skin. By way of example, the facial recognition module 312 uses the facial landmark module 322's information to remove, from pixels corresponding to a person's face, the person's eyes and mouth. This is because these portions of faces are not generally colored in a same manner as skin of other body parts, e.g., neck, arms, legs, and so on. Indeed, a person's eyes typically have colors that are not common in skin tones. To this end, the detected face data 320 describes portions of the digital image 302 that correspond to detected faces and remain after removal of non-skin portions, e.g., eyes, mouth, and so forth. In other words, the detected face data 320 indicates the portions of the image that correspond solely to skin of a detected face. In one or more implementations, the skin selection module 118 limits use of the facial landmark module 322 to pixels that are determined to be part of a face by the facial recognition module 312. In this way, the facial landmark module 322 is leveraged in a manner that is more efficient than if used in relation to each pixel of the digital image 302.

The color determination module 314 is depicted obtaining the detected face data 320. The color determination module 314 represents functionality to identify skin colors from a detected face. In particular, the detected face data 320 indicates pixels that correspond to the skin of detected faces and the color determination module 314 determines colors of these pixels. The color determination module 314 memorializes these determinations by producing the face color data 324, which indicates the skin colors identified by the color determination module 314. The face color data 324 may indicate the identified colors in a variety of ways without departing from the spirit or scope of the described techniques. By way of example, the color determination module 314 may generate the face color data 324 as a list of colors identified in the depicted face skin (e.g., a list of different RGB values), as a range of colors identified (e.g., a range of RGB values), and so forth. The skin colors indicated by the face color data 324 are then used to identify exposed skin in the digital image.

The color detection module 316 represents functionality to identify pixels of the digital image 302 with a color that is the same or similar to the colors indicated by the face color data 324. In contrast to conventional techniques, the skin selection module 118 limits use of the color detection module 316 to pixels of the digital image 302 that are indicated by the object masks 310. By way of example, the color detection module 316 limits use of a color detection algorithm solely to pixels of the digital image 302 that correspond to detected persons—the color detection module 316 does not use this algorithm in relation to pixels corresponding to other portions of the digital image 302. The color detection module 316 may identify pixels with a similar or same color as the colors indicated by the face color data 324 by comparing pixel values to the colors indicated by the face color data 324. In particular, the color detection module 316 compares values of the pixels indicated by the object masks 310 to the colors indicated by the face color data 324. If a pixel value of one of these pixels is the same or similar to a color indicated by the face color data 324, the color detection module 316 determines that the pixel corresponds to exposed skin. If a pixel value is not similar to a color indicated by the face color data 324, however, then the color detection module 316 determines that the pixel does not correspond to exposed skin.

To determine whether a pixel value is "similar" to a color indicated by the face color data 324, the color detection module 316 may employ a color range algorithm. In one or more implementations, the color detection module 316 employs this algorithm by initially assigning each pixel indicated by the object masks 310 a score relative to a skin tone color range, e.g., as indicated by the face color data 324. By way of example, the color detection module 316 may assign each pixel an 8-bit score between '0' and '255,' where a score of '0' indicates that a pixel does not match any of the colors indicated by the face color data 324, a score of '255' indicates the pixel is an exact match with a color indicated by the face color data 324, and an intermediate value indicates a partial match of the pixel to colors indicated by the face color data 324. The color detection module 316 may be configured to generate a closeness score matrix as a grayscale image in accordance with these scores. Here, the color detection module 316 translates a score of '0' into a black pixel, a score of '255' into a white pixel, and an intermediate score into a gray pixel of varying shades. The grayscale image thus formed may operate as a mask, such that white pixels of the mask indicate inclusion of the corresponding image pixels in the selection of skin data, black pixels indicate exclusion of the corresponding pixels in the selection, and shades of gray represent partial matching with identified skin tones.

In one or more implementations, the skin selection module 118 also performs one or more noise removal techniques to remove false positives and false negatives from the selected skin data 318. In the context of the described techniques, false positives are portions of the digital image 302 that do not actually correspond to exposed human skin, but that the color detection module 316 identifies as skin. In contrast, false negatives are portions of the digital image 302 that actually correspond to exposed human skin, but that the color detection module 316 does not identify as skin. The skin selection module 118 performs these noise removal techniques to fix the false positives and false negatives, such that the portions of the digital image 302 that are identified as skin but are not actually skin are not included in the selection and such that the portions of the digital image that are not identified as skin but are actually skin are included in the selection.

In accordance with the described techniques, the skin selection module 118 processes initially generated skin selection data to perform noise removal. As part of this, the skin selection module 118 may apply a threshold to a mask indicative of the skin selection, such as the grayscale mask (having values from 0-255) discussed just above. The threshold may correspond simply to a particular value (e.g., 192), such that the skin selection module 118 compares values indicated by the grayscale image to the threshold. If the comparison indicates that a pixel has a grayscale image value less than this threshold, then the skin selection module 118 identifies the pixel as not being human skin. The skin selection module 118 adjusts the selected skin data 318 to indicate such determinations accordingly.

The skin selection module 118 also determines which portions of the digital image 302, indicated by the initially generated skin selection data, correspond to skin based on a shape of the portions. To determine this, the skin selection module 118 computes contours of the portions of the digital image 302 that are indicated by the initially generated skin selection data. The skin selection module 118 may compute an average intensity of these contours, for instance. In one or more implementations, the skin selection module 118 computes an average intensity of a contour according to the following:

$$\text{Average intensity of a contour} = \frac{\sum \text{grayscale pixel values in a region}}{\text{area of contour}}$$

Based on computed average contour intensities, the skin selection module 118 identifies portions of the initially generated skin selection data as not corresponding to human skin, and adjusts the selected skin data 318 accordingly. For instance, the skin selection module 118 identifies portions of the grayscale image that have an average intensity less than an intensity threshold as not corresponding to human skin. Further, the skin selection module 118 may identify portions with an area that is smaller than a threshold area (e.g., 10% of area of a face region) as not being human skin. In one or more implementations, the skin selection module 118 may further perform morphological transformation techniques, such as dilation, erosion, opening, and closing, to remove false positives from the selected skin data 318 and adjust for false negatives indicated by the selected skin data 318. Accordingly, the illustrated selected skin data 318 output by the skin selection module 118 is adjusted from initially generated selected skin data by detecting and adjusting for false positives and false negatives.

Based in part on pixels within the object masks 310 identified as having skin colors, the skin selection module 118 generates the selected skin data 318. As noted above, this selected skin data 318 indicates the pixels of the digital image 302 that correspond to exposed skin without indicating other portions of the digital image 302, such as portions of the digital image 302 having a same or similar color as skin but that do not actually correspond to depicted skin. The object recognition module 116 and skin selection module 118 can generate selected skin data 318 for one or more persons depicted in the image, and do so without selecting other portions of the image. In this context, consider FIG. 4.

Figure 4:
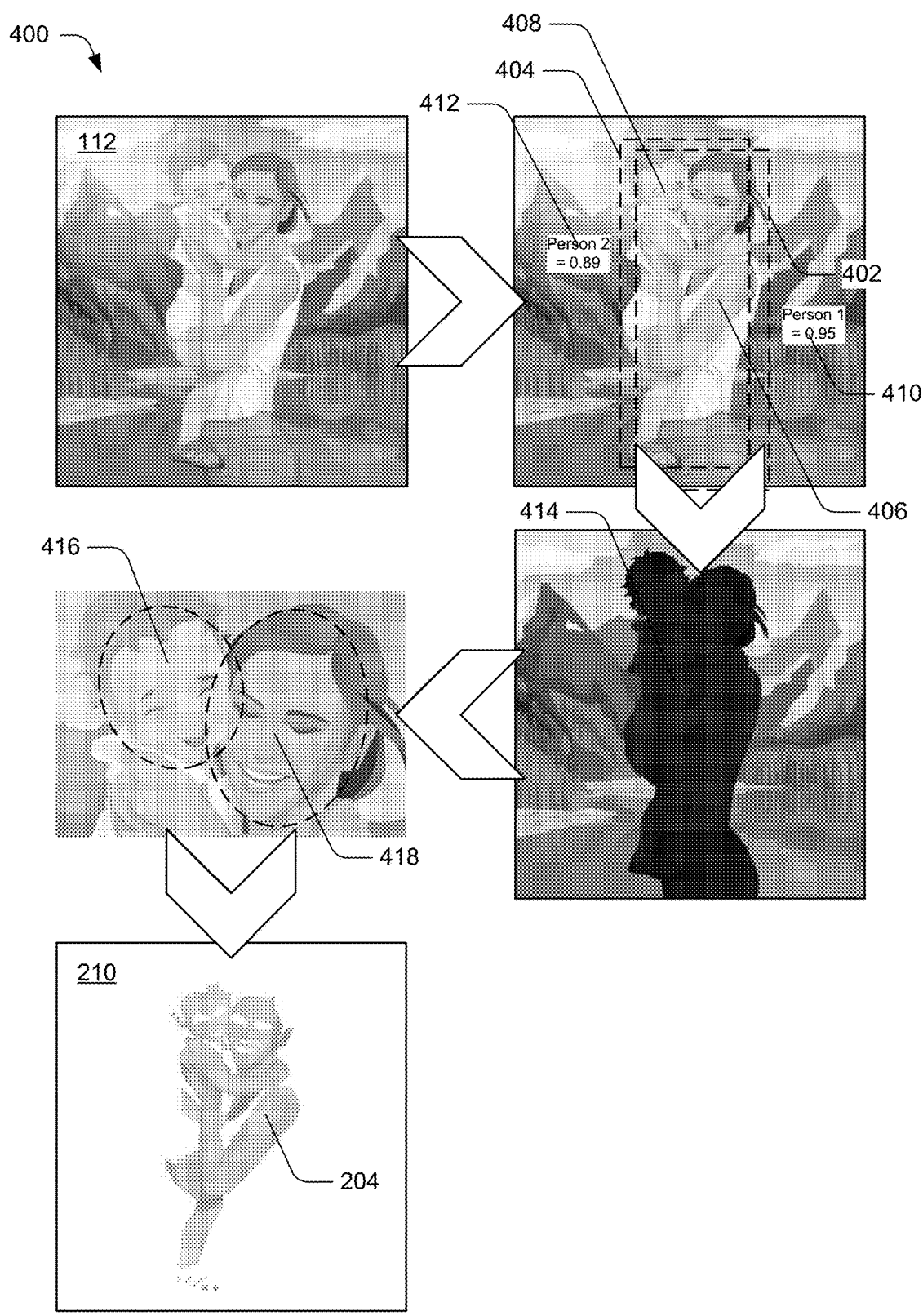
FIG. 4 depicts an example implementation in which exposed skin of two persons depicted in photorealistic digital image is selected without selecting other portions of the image.

FIG. 4 depicts an example 400 of an implementation in which exposed skin of two persons depicted in a photorealistic digital image is selected without selecting other portions of the image. In particular, the illustrated example 400 includes the photographic image 112 from FIG. 1 and the skin selection 210.

In this scenario, the photographic image 112 is initially provided as input to the object recognition module 116. The object recognition module 116 leverages functionality represented by the object detection module 304 (e.g., an RCNN) to generate bounding boxes 402, 404 surrounding depicted woman 406 and depicted child 408, respectively. In one or more implementations, representations of the bounding boxes 402, 404 are displayable and can be indicated with emphasized lines, e.g., that are emphasized with color, line type, line weight, animations, and so forth. The object detection module 304 may also compute confidence levels in connection with the bounding boxes to indicate a confidence that an object surrounded by a bounding box is accurately identified. For instance, the object detection module 304 computes confidence levels with the bounding boxes 402, 404 that are indicative of a level of confidence that the objects surrounded by these boxes are humans. The illustrated example 400 depicts these confidence levels along with labels of the identified object (e.g., Person 1 and Person 2) being displayed in overlays 410, 412 with the bounding box representations.

These bounding boxes 402, 404 are provided as input to the object masking module 306. The object masking module 306 generates object masks 414 based on the received bounding boxes 402, 404. In one or more implementations, the object masking module 306 generates one of the object masks 414 for each detected person. Accordingly, the object masks 414 of the illustrated example represent two object masks—one object mask for the depicted woman 406 and one object mask for the depicted child 408. In accordance with the described techniques, the object masking module 306 generates the object masks 414 by processing solely the pixels of the photographic image 112 that are within the bounding boxes 402, 404. The pixels outside the bounding boxes 402, 404 are not considered for generating the object masks 414. As noted above, the object masking module 306 may generate the object masks 414 by leveraging a machine-learning model that is different from the machine-learning model used to generate the bounding boxes 402, 404.

The skin selection module 118 generates the skin selection 210 based on these object masks 414. To do so, the skin selection module 118 may process the mask associated with one bounding box at a time. In particular, the skin selection module 118 may process the masks in order from smallest to largest, e.g., in terms of bounding box size. To this extent, the skin selection module 118 determines a size of the bounding boxes 402, 404. In the illustrated example 400 assume that the bounding box 404 generated for the depicted child 408 is smaller than the bounding box 402 generated for the depicted woman 406. Based on the bounding box 404 for the child being smaller than the bounding box 402 for the woman, the skin selection module 118 initially generates a respective portion of the skin selection 210 for the depicted child.

Initially, the skin selection module 118 leverages functionality of the facial recognition module 312 to detect a face of the child 416. In accordance with one or more implementations, the facial recognition module 312 is limited to considering the pixels indicated by the depicted child 408's object mask 414 for facial recognition. As noted above, the facial recognition module 312 may also use the facial landmark module 322 to detect landmarks of the face of the child 416. Pixels corresponding to at least some of these landmarks, e.g., eyes and mouth, are removed from the detected face data 320 produced by the facial recognition module 312.

The color determination module 314 then identifies skin colors present in the face of the child 416. In particular, the color determination module 314 identifies the colors in the skin of the child's face—not colors of the removed facial landmarks. The color determination module 314 generates the face color data 324 to indicate the colors identified in the skin of the depicted child 408's face. The color detection module 316 compares values of the pixels indicated by the depicted child 408's object mask 414 to the identified colors indicated by the face color data 324. As described in more detail above, the skin selection module 118 is configured to generate a respective portion of the skin selection 210 for the depicted child 408 based on this comparison.

Once the portion of the skin selection 210 is generated for the depicted child 408, the skin selection module 118 generates a respective portion of the skin selection 210 for the depicted woman 406. This involves the facial recognition module 312 detecting a face of the woman 418, the color determination module 314 identifying skin colors of the depicted woman 406's facial skin, the color detection module 316 comparing the pixels indicated by the depicted woman 406's object mask 414 to the identified colors, and so forth. As noted in the discussion of FIG. 2, this enables the skin selection module 118 to generate the skin selection 210 to include the selected skin 204 without including other portions of the photographic image 112 that are skin-colored but that do not correspond to human skin.

Having discussed example details of the techniques for depicted skin selection, consider now some example procedures to illustrate additional aspects of the techniques.

Example Procedures

This section describes example procedures for depicted skin selection in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations, the procedures are performed by a suitably configured device, such as the computing device 102 of FIG. 1 having an image processing system 114 that makes use of an object recognition module 116 and a skin selection module 118 or one implemented as the example system 300 of FIG. 3, which also make use of those modules.

Figure 5A:
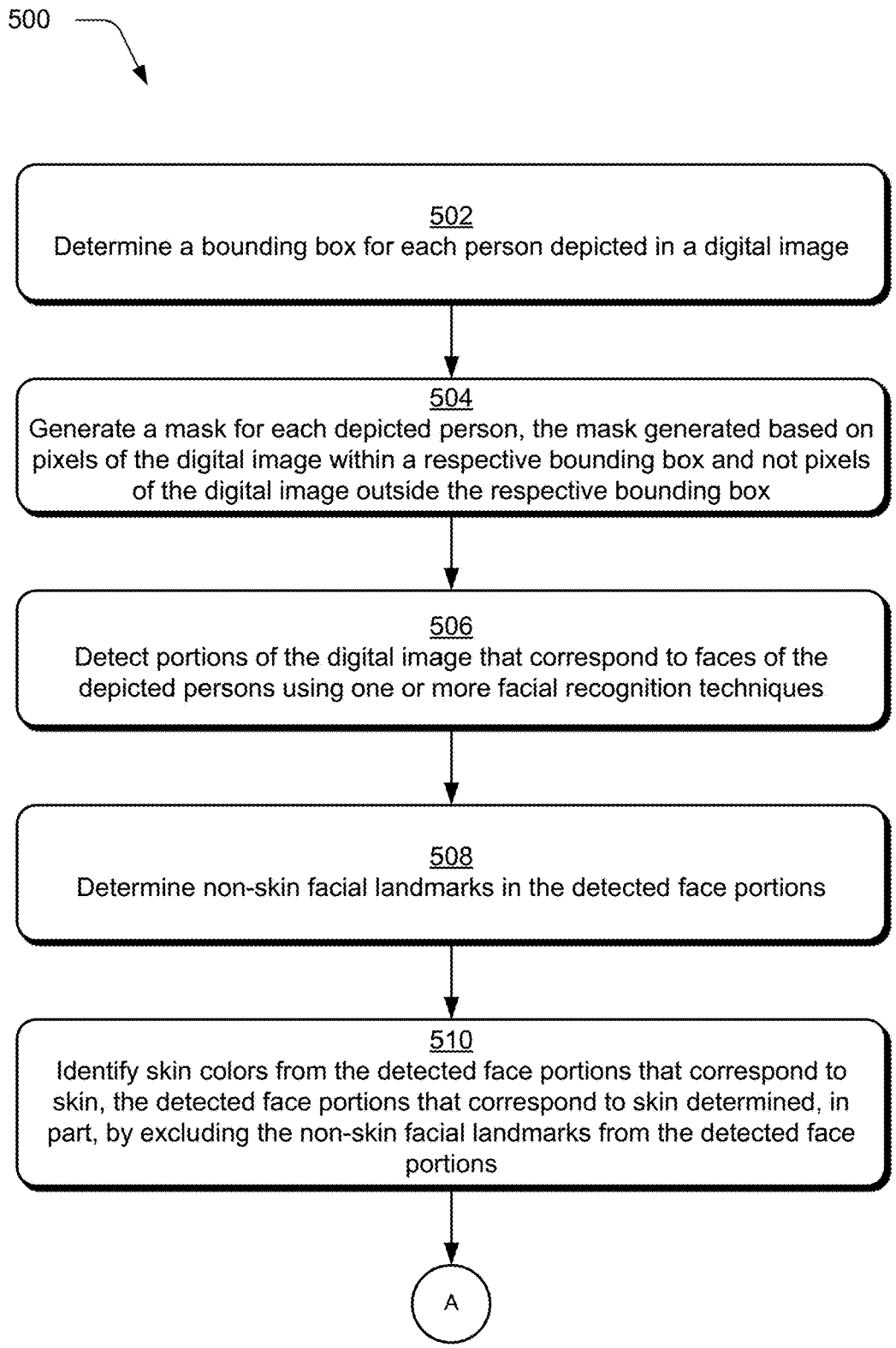
FIGS. 5A and 5B depict a procedure in an example implementation in which skin depicted in a photorealistic digital image is selected without selecting other portions of the image.
Figure 5B:
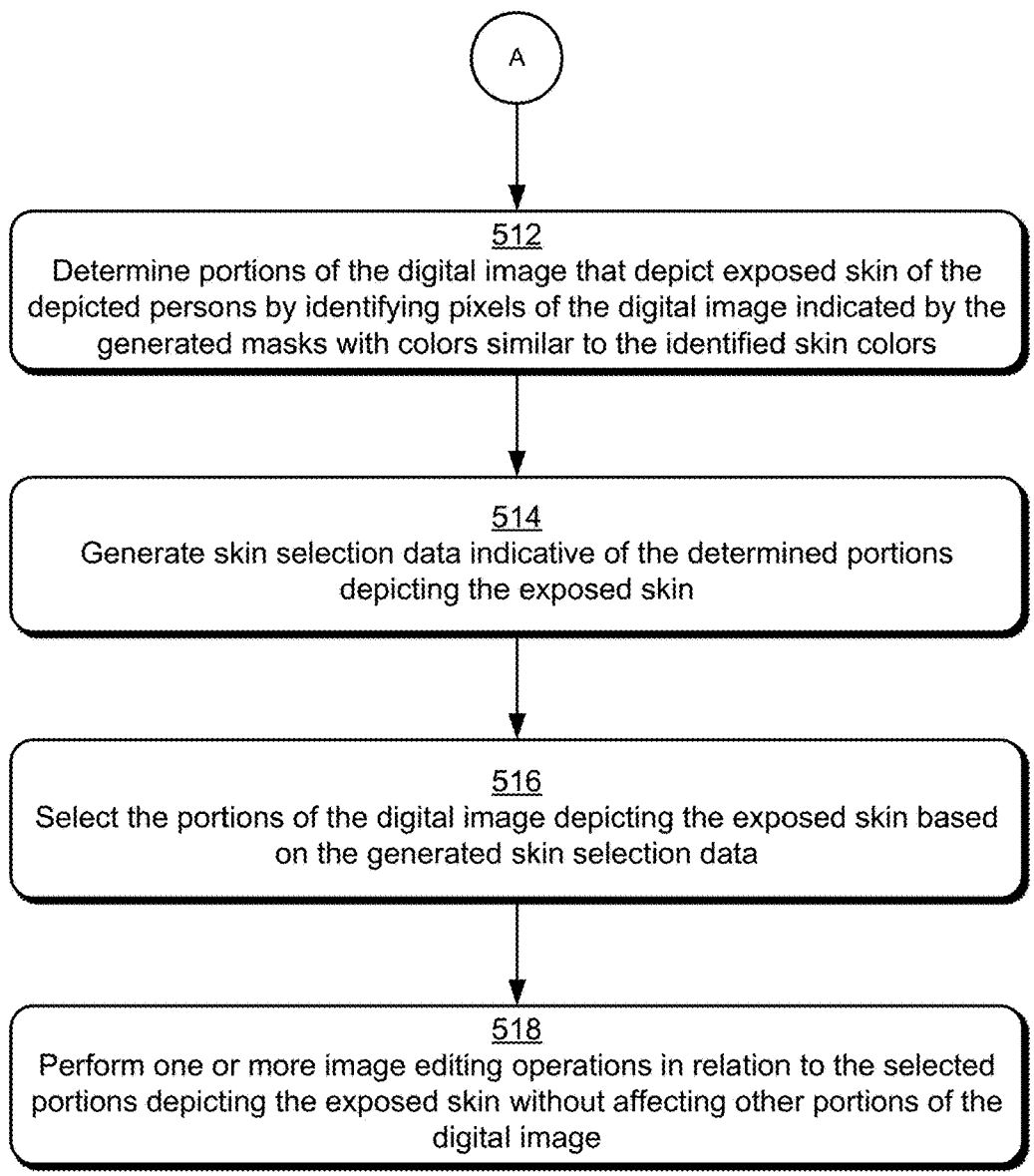

FIGS. 5A and 5B depict an example procedure 500 in which skin depicted in a photorealistic digital image is selected without selecting other portions of the image. A bounding box is determined for each person depicted in a digital image (block 502). By way of example, the object detection module 304 determines the bounding boxes 402, 404 for each person depicted in the photographic image 112, e.g., for the depicted woman 406 and the depicted child 408.

A mask is generated for each depicted person in the digital image (block 504). In accordance with the principles discussed herein, the mask is generated for a depicted person based on the pixels of the digital image within a respective bounding box—not based on pixels outside the respective bounding box. By way of example, the object masking module 306 generates the object mask 414 corresponding to the depicted woman 406 based on pixels of the photographic image 112 that are bounded by the bounding box 402—not based on the pixels of the photographic image 112 that are outside of the bounding box 402. Similarly, the object masking module 306 generates the object mask 414 corresponding to the depicted child 408 based on pixels of the photographic image 112 that are bounded by the bounding box 404—not based on the pixels of the photographic image 112 that are outside of the bounding box 404.

Portions of the digital image that correspond to faces of the depicted persons are detected using one or more facial recognition techniques (block 506). In accordance with the principles discussed herein, the faces are detected from the portions of the digital image that correspond to the generated masks. By way of example, the facial recognition module 312 detects the face of the child 416 and the face of the woman 418 with a facial recognition technique. In particular, the facial recognition module 312 detects the face of the child 416 by processing solely the pixels indicated by the object mask 414 corresponding to the depicted child 408, such that other portions of the photographic image 112 are not considered for this facial recognition. Similarly, the facial recognition module 312 detects the face of the woman 418 by processing solely the pixels indicated by the object mask 414 corresponding to the depicted woman 406, such that other portions of the photographic image 112 are not considered for this facial recognition.

Non-skin facial landmarks of the detected faces are determined (block 508). By way of example, the facial landmark module 322 determines non-skin facial landmarks of the face of the child 416 and the face of the woman 418. In one or more implementations, the non-skin facial landmarks are determined according to a selected list. This list includes facial landmarks the facial landmark module 322 is capable of detecting that are not considered face skin. Examples of non-skin facial landmarks include a detected person's eyes and mouth.

Skin colors are identified from portions of the detected faces that correspond to skin (block 510). In accordance with the principles discussed herein, the portions of the faces that correspond to skin are determined, in part, by excluding the non-skin facial landmarks from the detected faces. By way of example, the color determination module 314 processes pixels corresponding to skin of the face of the child 416 and the face of the woman 418 to identify colors of those pixels. The pixels corresponding to the skin of the face are determined, in part, by excluding the non-skin facial landmarks determined at block 508. The color determination module 314 generates the face color data 324 to indicate these identified skin colors. The procedure 500 continues at 'A' from FIG. 5A to FIG. 5B.

Portions of the digital image that correspond to exposed skin of the depicted persons are determined (block 512). In accordance with the principles discussed herein, the portions corresponding to exposed skin are determined, in part, by identifying pixels of the digital image that both are indicated by the generated masks and have a color similar to the identified skin colors. By way of example, the color detection module 316 identifies the pixels of the photographic image 112 that are indicated by the object masks 414 and have a color that is similar to the colors identified at block 510. Based in part on identification of these pixels, the skin selection module 118 determines the portions of the photographic image 112 that correspond to exposed skin of the depicted woman 406 and the depicted child 408.

Skin selection data is generated that is indicative of the determined portions of the digital image depicting the exposed skin (block 514). By way of example, the skin selection module 118 generates the selected skin data 318 to describe the portions of the photographic image 112 that are determined at block 512 to correspond to the exposed skin of the depicted woman 406 and the depicted child 408.

The portions of the digital image depicting the exposed skin are selected based on the generated skin selection data (block 516). By way of example, the image processing system 114 selects the selected skin 204 of the photographic image 112 based on the selected skin data 318. At least one image editing operation is performed in relation to the selected portions depicting the exposed skin (block 518). In accordance with the principles discussed herein, the at least one image editing operation performed in relation to the selected portions depicting the exposed skin does not affect other portions of the digital image. By way of example, the content editing application 104 performs an image editing operation in relation to the selected skin 204. For instance, the content editing application 104 performs operations in relation to the selected skin 204 such as blemish removal, smoothing, darkening, lightening, and so forth. The selected skin data 318 enables the content editing application 104 to perform these operations in relation to the selected skin 204 without affecting other portions of the photographic image 112.

Figure 6:
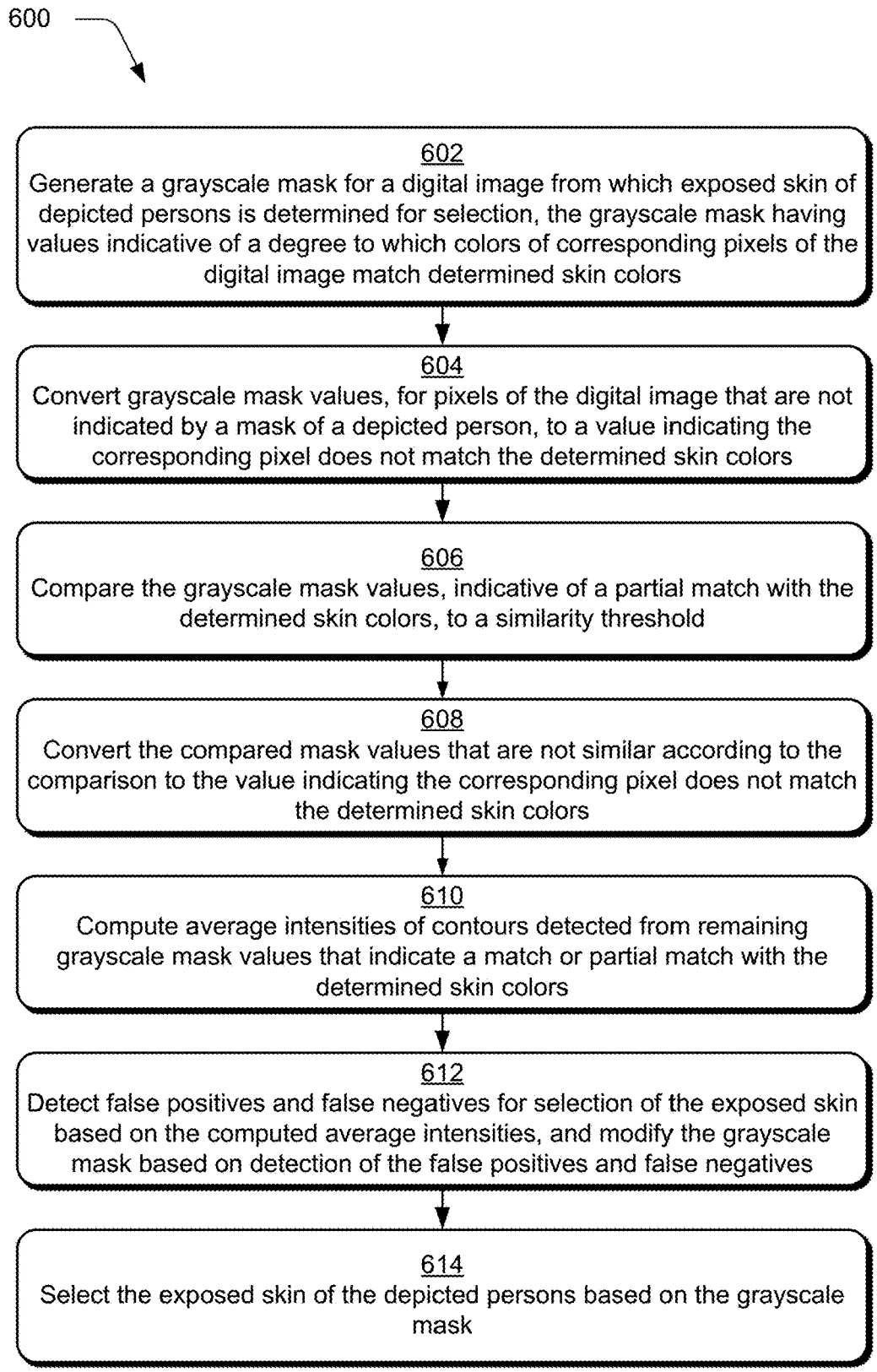
FIG. 6 depicts a procedure in an example implementation in which a grayscale mask is generated to select exposed skin of persons depicted in a digital image.

FIG. 6 depicts an example procedure 600 in which a grayscale mask is generated to select exposed skin of persons depicted in a digital image.

A grayscale mask is generated for a digital image from which exposed skin of depicted persons is determined for selection (block 602). In accordance with the principles discussed herein, the grayscale mask is formed to include values indicative of a degree to which colors of the pixels of the digital image match determined skin colors. By way of example, the skin selection module 118 generates the grayscale mask based on the face color data 324 and colors of pixels of the photographic image 112 determined by the color detection module 316. This grayscale mask indicates a degree to which colors of the photographic image 112's pixels match the determined skin colors indicated by the face color data 324. By way of example, the grayscale mask value corresponding to a pixel that does not match the determined skin colors may be set to a black value, the grayscale mask value corresponding to a pixel that does match the determined skin colors may be set to a white value, and the grayscale mask value corresponding to a pixel that is a partial match may be set to a varying gray value between black and white.

For pixels of the digital image that are not indicated by a mask of a depicted person, corresponding grayscale mask values are converted to a value indicating a respective pixel does not match the determined skin colors (block 604). For the pixels of the photographic image 112 that are not indicated by the object masks 414, for instance, the skin selection module 118 converts corresponding grayscale mask values to a value (e.g., for black) indicating a respective pixel does not match the determined skin colors that are indicated by the face color data 324.

The grayscale mask values that are indicative of a partial match with the determined skin colors are compared to a similarity threshold (block 606). By way of example, the skin selection module 118 compares values of the grayscale mask to a similarity threshold, e.g., a particular gray level.

Compared mask values, corresponding to pixels that are not similar to the determined skin colors according to the comparison, are converted to the value indicating a respective pixel does not match the determined skin colors (block 608). By way of example, the skin selection module 118 converts the grayscale mask values that are not similar to the determined skin colors, according to the comparison of block 606, to the value indicating a respective pixel does not match the determined skin colors. Given the example in which the similarity threshold corresponds to a particular gray level, the skin selection module 118 converts the grayscale mask values that are darker than the particular gray level to the value (e.g., for black) indicating the respective pixel does not match the determined skin color.

For contours that are detected in the remaining grayscale mask values indicative of a match or partial match with the determined skin colors, average intensities are computed (block 610). By way of example, the skin selection module 118 detects contours in grayscale values that, after the conversion of block 608, indicate a match or partial match with the determined skin colors. The skin selection module 118 further computes average intensities for these detected contours as described in more detail above.

False positives and false negatives for selection of the exposed skin are detected based on the computed average intensities (block 612). In accordance with the principles discussed herein, the grayscale mask is modified based on the detection to remove the false positives and false negatives. By way of example, the skin selection module 118 detects false positives and false negatives based on the average intensities computed at block 610. In one or more implementations, false positives are pixels that initially are identified as corresponding to skin but that do not actually correspond to skin whereas false negatives are pixels that initially are not identified as corresponding to skin but that actually do correspond to skin. The skin selection module 118 modifies the grayscale mask values of detected false positives to the value (e.g., for black) indicating the respective pixel does not match the determined skin colors. The skin selection module 118 further modifies the grayscale mask values of detected false negatives to the value (e.g., for white) indicating the respective pixel does match the determined skin colors.

The exposed skin of the depicted persons is selected based on the grayscale mask (block 614). By way of example, the image processing system 114 selects the selected skin 204 according to the grayscale mask with the modified values.

Having described example procedures in accordance with one or more implementations, consider now an example system and device that can be utilized to implement the various techniques described herein.

Example System and Device

Figure 7:
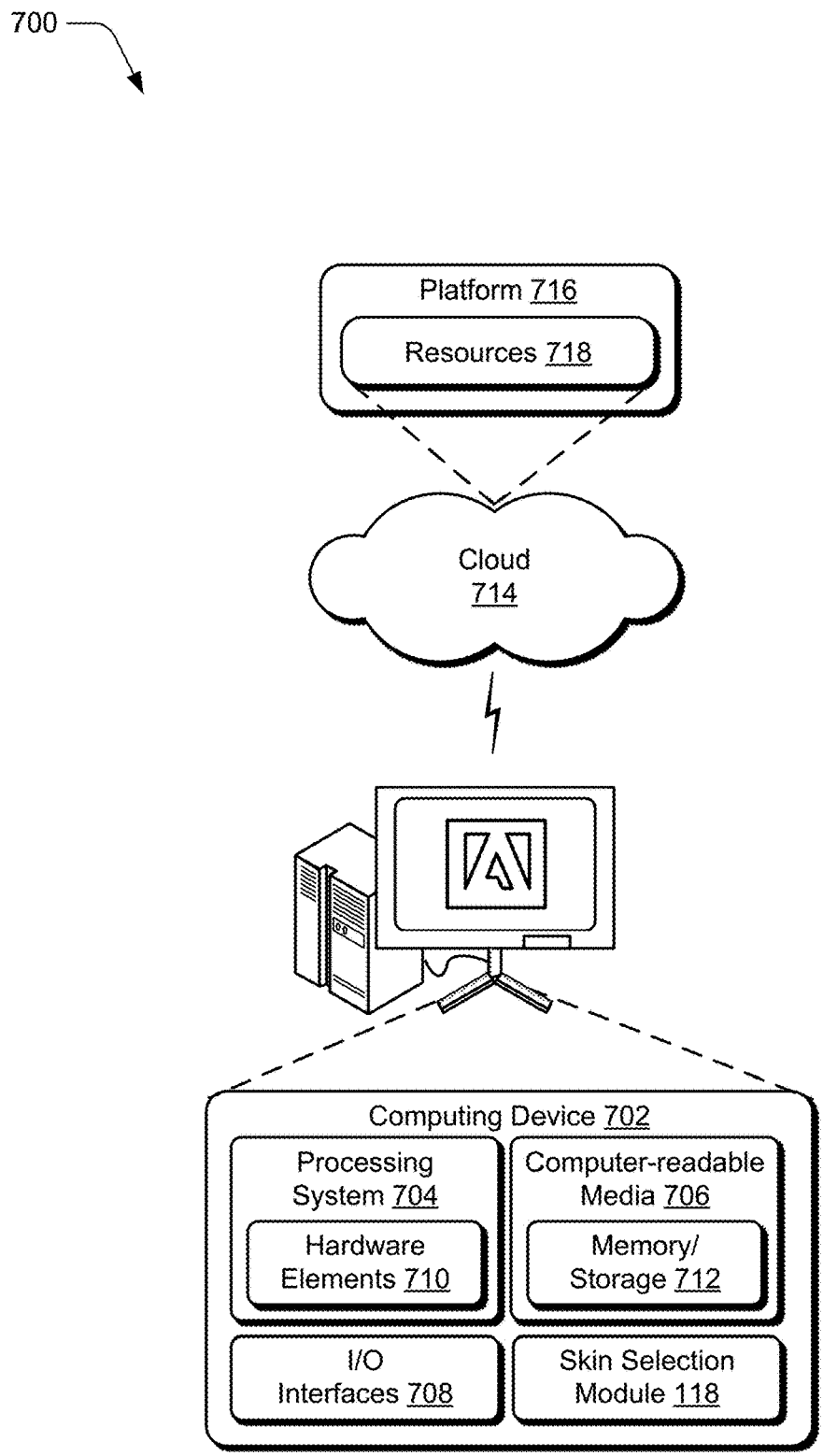
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the skin selection module 118. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to select exposed skin of persons depicted in digital images, a method comprising:
    determining, by a computing device, a bounding box for a person depicted in a digital image using a first machine-learning model configured to determine bounding boxes of persons depicted in image content;
    generating, by the computing device, an object mask that indicates pixels of the digital image corresponding to the depicted person, the object mask generated using a second machine-learning model configured to generate object masks of persons depicted in image content given bounding boxes surrounding the persons;
    identifying, by the computing device, the pixels indicated by the object mask having a color similar to at least one exposed skin color of the depicted person; and
    generating, by the computing device, skin selection data describing the identified pixels.

2. A method as described in claim 1, wherein the skin selection data is effective to select a portion of the digital image corresponding to exposed skin of the depicted person without selecting other portions of the digital image.

3. A method as described in claim 2, wherein at least one of the other portions of the digital image has a color similar to the at least one exposed skin color of the depicted person.

4. A method as described in claim 1, further comprising selecting a portion of the digital image corresponding to exposed skin of the depicted person based on the skin selection data.

5. A method as described in claim 4, further comprising performing an image editing operation with an image editing application in relation to the selected portion.

6. A method as described in claim 5, wherein the image editing operation is performed without affecting other portions of the digital image.

7. A method as described in claim 1, further comprising detecting a face of the depicted person in the digital image; and
    determining the at least one exposed skin color by identifying colors of the pixels of the digital image corresponding to the detected face.

8. A method as described in claim 7, wherein the face is detected, in part, by limiting the pixels of the digital image that are processed using a facial recognition technique to the pixels indicated by the object mask.

9. A method as described in claim 7, further comprising identifying non-skin facial landmarks of the detected face;
identifying the pixels of the digital image corresponding to skin of the detected face based, in part, on the pixels of the digital image corresponding to the non-skin facial landmarks; and
determining the at least one exposed skin color by identifying colors of the pixels of the digital image corresponding to the skin of the detected face.

10. A method as described in claim 9, wherein the non-skin facial landmarks are identified according to a list that includes at least eyes and mouths of depicted persons.

11. A method as described in claim 1, wherein the digital image depicts at least one additional person, and the method further includes:
determining at least one additional bounding box for the at least one additional person;
generating at least one additional object mask that indicates the pixels of the digital image corresponding to the at least one additional person, the at least one additional object mask generated, in part, by limiting the pixels of the digital image that are processed with the object masking technique to pixels within the at least one additional bounding box;
determining sizes of the bounding box and the at least one additional bounding box; and
based on the determined sizes, such that exposed skin pixels are identified in connection with smaller bounding boxes before the exposed skin pixels are identified in connection with larger bounding boxes, identifying:
the pixels indicated by the object mask having a color similar to the at least one exposed skin color of the depicted person; and
the pixels indicated by the at least one additional object mask having a color similar to at least one exposed skin color of the at least one additional person.

12. A method as described in claim 11, further comprising generating the skin selection data, the skin selection data describing the identified pixels for the depicted person and the at least one additional person.

13. A method as described in claim 1, wherein the mask is generated, in part, by limiting the pixels of the digital image that are processed using the second machine learning model to pixels within the bounding box.

14. A system comprising:
an object detection module implemented at least partially in hardware of at least one computing device to determine bounding boxes for persons depicted in a digital image using a first machine-learning model configured to determine bounding boxes of persons depicted in image content;
an object masking module implemented at least partially in the hardware of the at least one computing device to generate object masks that indicate portions of the digital image corresponding to the depicted persons, the object masking module further configured to generate the object masks using a second machine-learning model configured to generate object masks of persons depicted in image content given bounding boxes surrounding the persons; and
a skin selection module implemented at least partially in the hardware of the at least one computing device to generate skin selection data effective to select portions of the digital image corresponding to exposed skin of the depicted persons without selecting other portions of the digital image, the skin selection module further configured to generate the skin selection data based on the object masks.

15. A system as described in claim 14, wherein the first machine-learning model is a regional convolutional neural network (RCNN) and is further configured to receive digital images depicting the persons as input and provide respective bounding boxes surrounding the depicted persons as output.

16. A system as described in claim 15, wherein the second machine-learning model is a deep learning model that is separate from the RCNN, the deep learning model configured to receive the respective bounding boxes surrounding the depicted persons as input and provide respective object masks describing pixels of the digital images that correspond to the depicted persons as output.

17. A system as described in claim 14, wherein the skin selection module processes the portions of the digital image indicated by the object masks to generate the skin selection data without processing portions of the digital image that are not masked by the object masks.

18. In a digital medium environment to select exposed skin of persons depicted in digital images, a method comprising:
generating, by a computing device, a grayscale mask for a digital image from which exposed skin of depicted persons is determined for selection, the grayscale mask having values corresponding to pixels of the digital image, the grayscale mask values being indicative of a degree to which the corresponding pixels match determined skin colors of the depicted persons;
converting, by the computing device and for the corresponding pixels of the digital image not indicated by a mask of a depicted person, the grayscale mask values to a value indicating a corresponding pixel does not match the determined skin colors;
comparing, by the computing device, the grayscale mask values indicative of a partial match with the determined skin colors to a similarity threshold;
converting, by the computing device, the compared grayscale mask values that are not similar, according to the comparing, to the value indicating the corresponding pixel does not match the determined skin colors;
detecting, by the computing device, false positive and false negative matches with the determined skin color based on remaining grayscale mask values indicating a match or the partial match with the determined skin colors; and
modifying, by the computing device, the grayscale mask values based on the detecting to remove the false positive and negative matches, the grayscale mask with the modified grayscale mask values being usable to select the exposed skin of the depicted persons.

19. A method as described in claim 18, further comprising selecting portions of the digital image corresponding to the exposed skin of the depicted persons without selecting other portions of the digital image based on the grayscale mask.

20. A method as described in claim 18, wherein:
the values indicative of the degree to which the colors of the corresponding pixels match the determined skin colors range from 0 to 255;
a value of 0 indicates the corresponding pixel does not match the determined skin colors, the grayscale mask values with the value of 0 are represented as black in the grayscale mask;

a value of 255 indicates the corresponding pixel does match the determined skin colors, the grayscale mask values with the value of 255 are represented as white in the grayscale mask; and values from 1 to 254 indicate the corresponding pixel is a partial match with the determined skin colors, the grayscale mask values with the values from 1 to 254 are represented as different grays in the grayscale mask.

\* \* \* \* \*